(12) United States Patent
Buck et al.

(10) Patent No.: US 8,560,989 B2
(45) Date of Patent: Oct. 15, 2013

(54) STATISTICAL CLOCK CYCLE COMPUTATION

(75) Inventors: Nathan Buck, Underhill, VT (US);
Brian Dreibelbis, Underhill, VT (US);
John P. Dubuque, Jericho, VT (US);
Eric A. Foreman, Fairfax, VT (US);
James C. Gregerson, Hyde Park, NY (US); Peter A. Habitz, Hinesburg, VT (US); Jeffrey G. Hemmett, St. George, VT (US); Debjit Sinha, Wappingers Falls, NY (US); Natesan Venkateswaran, Hopewell Junction, NY (US); Chandramouli Visweswariah, Croton-on-Hudson, NY (US); Michael H. Wood, Hopewell Junction, NY (US); Vladimir Zolotov, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/311,832

(22) Filed: Dec. 6, 2011

(65) Prior Publication Data
US 2013/0145333 A1 Jun. 6, 2013

(51) Int. Cl.
G06F 17/50 (2006.01)
(52) U.S. Cl.
USPC ......................................................... 716/108
(58) Field of Classification Search
USPC ................................................ 716/100, 108
See application file for complete search history.

(56) References Cited

U.S. PATENT DOCUMENTS

| | | | |
|---|---|---|---|
| 7,269,805 B1 | 9/2007 | Ansari et al. | |
| 7,469,394 B1 | 12/2008 | Hutton et al. | |
| 7,475,366 B2 | 1/2009 | Kuemerle et al. | |
| 7,539,893 B1 | 5/2009 | Ferguson | |
| 8,341,568 B2 * | 12/2012 | Chen et al. | 716/106 |
| 2004/0002844 A1 | 1/2004 | Jess et al. | |
| 2010/0180243 A1 * | 7/2010 | Sinha et al. | 716/6 |
| 2010/0281442 A1 | 11/2010 | Dickinson et al. | |
| 2010/0293512 A1 | 11/2010 | Buck et al. | |
| 2010/0313177 A1 * | 12/2010 | Zhang et al. | 716/108 |
| 2011/0106497 A1 * | 5/2011 | Visweswariah et al. | 702/182 |

OTHER PUBLICATIONS

Sivaswamy, S. et al., "Statistical Generic and Chip-Specific Skew Assignment for Improving Timing Yield of FPGAs", IEEE, 2007, pp. 429-434.
Gong, M. et al., "Binning Optimization for Transparently-Latched Circuits", IEEE Transactions on Computer-Aided Design of Integrated Circuits and Systems, vol. 30, No. 2, Feb. 2011, pp. 270-283.
Chung, C. et al., "Fine resolution double edge clipping with calibration technique for built-in at-speed delay testing", Dept. of Electrical Engineering, Feng-Chia University, Design Automation Conference, IEEE, 2010, pp. 367-368.
Agarwal, A. et al., "Statistical Clock Skew Analysis Considering Intra-Die Process Variations", University of Michigan, Motorola Inc., ICCAD Nov. 11-13, 2003, pp. 914-921.

* cited by examiner

*Primary Examiner* — Suchin Parihar
(74) *Attorney, Agent, or Firm* — Richard Kotulak; Roberts Mlotkowski Safran & Cole, P.C.

(57) ABSTRACT

Systems and methods for statistical clock cycle computation and closing timing of an integrated circuit design to a maximum clock cycle or period. The method includes loading a design and timing model for at least one circuit path of an integrated circuit or a region of the integrated circuit into a computing device. The method further includes performing a statistical static timing analysis (SSTA) of the at least one circuit path using the loaded design and timing model to obtain slack canonical data. The method further includes calculating a maximum circuit clock cycle for the integrated circuit or the specified region of the integrated circuit in linear canonical form based upon the slack canonical data obtained from the SSTA.

20 Claims, 8 Drawing Sheets

US 8,560,989 B2

STATISTICAL CLOCK CYCLE COMPUTATION

FIELD OF THE INVENTION

The invention relates to systems and methods to optimize circuits and, more particularly, to systems and methods for closing timing of an integrated circuit design to a maximum clock cycle or period.

BACKGROUND

It is commonly recognized that electrical characteristics of transistors and interconnects are not the same for different chips and even for the same chip at different periods of time or chip locations. Variation of electrical characteristics can be due to variation of process parameters, changing of environmental conditions and even chip age (e.g., Hot Carriers Injections, Negative Bias Temperature Instability, electromigration, and so forth).

The variation of electrical characteristics results in variations of gate timing characteristics. The traditional conservative way to handle these variations is to consider so-called process corners at which the gates have the worst combinations of delays. Then chips are designed so that they can properly function at all process corners assuming that as a result they will function at any other combination of gate delays.

However, with decreasing transistor size and interconnect width, the variation of electrical characteristics is becoming proportionally larger. Therefore, the approach to design for process corners results in too conservative and non-optimal designs because most design efforts and chip resources are spent to make chips function at very low-probability combinations of electrical characteristics.

An alternative approach to designing chips is to consider actual statistical characteristics of process parameter variations and use them to compute statistical characteristics of a designed circuit. For digital circuits, this approach is known as statistical timing analysis. There are several varieties of statistical timing analysis.

One of the most useful for circuit analysis and optimization is parameterized statistical static timing analysis (SSTA). In SSTA, the circuit delay is considered a random variable and the objective of SSTA is to compute its probability distribution. From the cumulative distribution function of the circuit delay, the user is then able to obtain the percentage of fabricated dies, which meets a certain delay requirement, or conversely, the expected performance for a particular yield. In turn, gate or transistor sizing approaches should perform their optimization in a statistical aware manner.

SSTA operates on a timing graph comprised of nodes, which represent points at which signal transitions can occur, and edges that connect incident nodes. Timing values are computed for the timing graph at each node based upon arrival times (ATs), which define the time (or the time distribution) at which a given signal arrives at a timing point, and required arrival times (RATs), which defines the time (or the time distribution) at which the signal is required to get to the timing point, in order to meet the timing requirements. These ATs and RATs are used to compute timing metrics in the form of slacks at nodes (RAT minus AT for late mode and AT minus RAT for early mode). Specifically, a positive slack s at a node implies that the AT at that node may be increased by s without affecting the overall delay of the circuit. Conversely, a negative slack implies that a path is too slow, and the path should be sped up (or the reference signal delayed) if the whole circuit is to work at the desired speed. A negative value for either a late mode slack or an early mode slack indicates a timing constraint violation. One goal of circuit placement is to have no paths with negative slack. Thus, in chip design optimization for a given frequency, typically the overall timing of the chip is closed to a positive slack. Unfortunately, the use of positive slack to close timing on the chip design can be computationally inefficient at times and provide overly pessimistic results.

Accordingly, there exists a need in the art to overcome the deficiencies and limitations described hereinabove.

SUMMARY

In a first aspect of the invention, a method is provided that comprises loading a design and timing model for at least one circuit path of an integrated circuit or a region of the integrated circuit into a computing device. The method further comprises performing a statistical static timing analysis (SSTA) of the at least one circuit path using the loaded design and timing model to obtain slack canonical data. The method further comprises calculating a maximum circuit clock cycle for the integrated circuit or the specified region of the integrated circuit in linear canonical form based upon the slack canonical data obtained from the SSTA.

In another aspect of the invention, a method is provided that comprises loading a design and timing model for at least one circuit path of an integrated circuit or region of an integrated circuit into a computing device. The method further comprises performing a statistical static timing analysis (SSTA) of the at least one circuit path using the loaded design and timing model. The method further comprises calculating a maximum circuit clock cycle for the integrated circuit or the specified region of the integrated circuit in linear canonical form based upon slack canonical input obtained from the SSTA. The method also comprises closing timing of the integrated circuit or the region of the integrated circuit using the calculated maximum circuit clock cycle.

In yet another aspect of the invention, a computer system is provided for closing timing of an integrated circuit design to a maximum circuit clock cycle. The system comprises a CPU, a computer readable memory, and a computer readable storage media. The system further comprises first program instructions for loading a design and timing model for at least one circuit path of an integrated circuit or region of an integrated circuit. The system further comprises second program instructions for performing a statistical static timing analysis (SSTA) of the at least one circuit path using the loaded design and timing model. The system further comprises third program instructions for calculating the maximum circuit clock cycle for the integrated circuit or the specified region of the integrated circuit in linear canonical form based upon slack canonical input obtained from the SSTA. The system further comprises fourth program instructions for closing timing of the integrated circuit or the region of the integrated circuit using the calculated maximum circuit clock cycle. The system further comprises the first, second, third, and fourth program instructions are stored on the computer readable storage media for execution by the CPU via the computer readable memory.

BRIEF DESCRIPTION OF THE SEVERAL VIEWS OF THE DRAWINGS

The present invention is described in the detailed description, which follows, in reference to the noted plurality of drawings by way of non-limiting examples of exemplary embodiments of the present invention.

DETAILED DESCRIPTION

Figure 1:
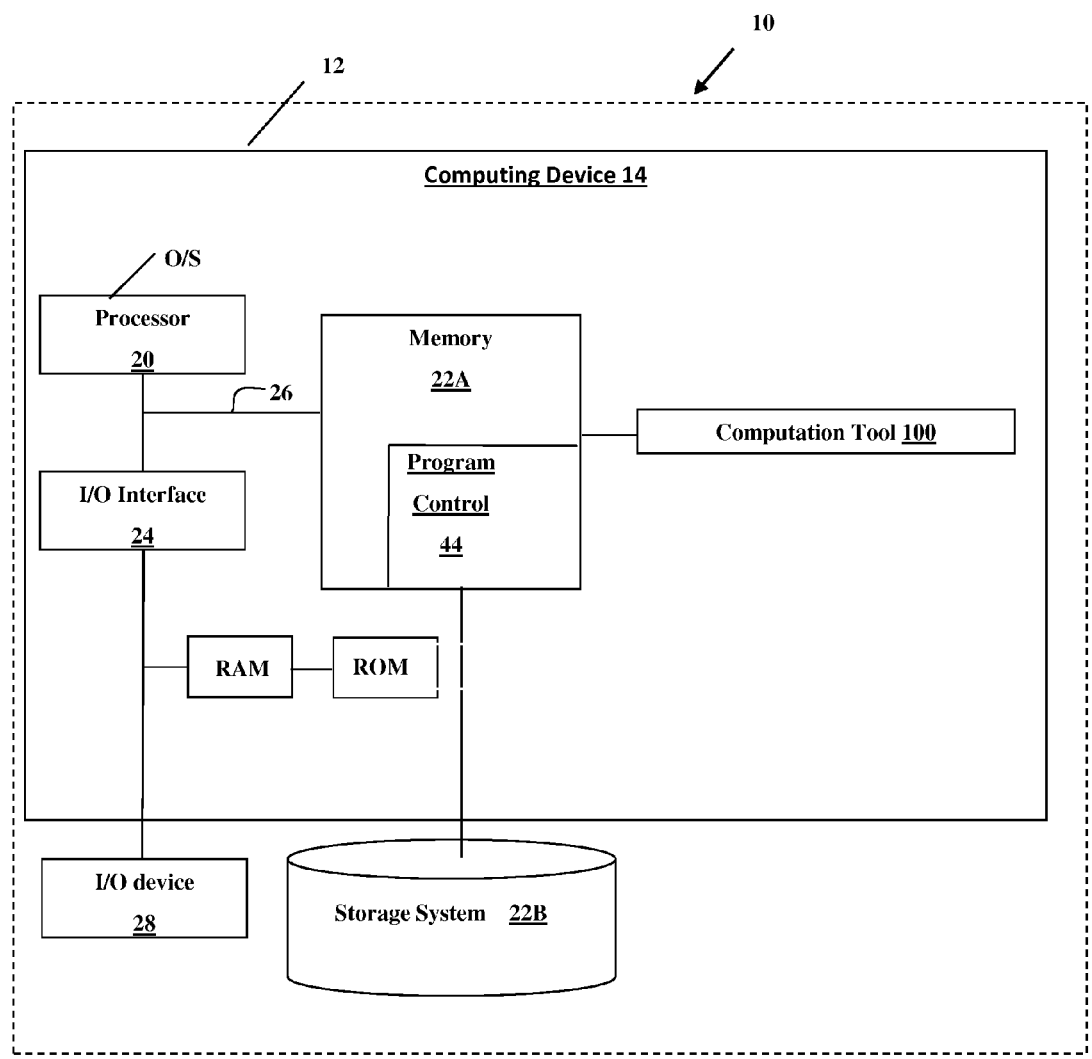
FIG. 1 is an illustrative external environment for implementing the invention in accordance with aspects of the invention.

The invention relates to systems and methods to optimize circuits and, more particularly, to systems and methods for closing timing of an integrated circuit design to a maximum clock cycle or period. More specifically, implementations of the invention provide systems and methods for computing an integrated circuit clock cycle and operation frequency as a function of process and environmental variations.

Traditional SSTA allows a designer to choose an acceptable probability of timing failure as a target for analysis. This timing yield represents a worst case scenario for a given slack probability density function curve for die to die analysis. Most SSTA solutions use a sensitivity-based approach to model the effect of variation on timing. This involves establishing how change in a particular device or interconnect parameter affects a desired property of the integrated circuit. This sensitivity to the parameter, in conjunction with its probability distribution (mean and standard deviation), provides a statistical model describing the probability that a parameter will have a certain effect on a device or interconnect property.

The sensitivities for device and interconnect along with the distribution information for each parameter can be used to generate probability density function s for AT, RAT, and slack which include the overall effect of all the parameters on timing. The variability of all the process factors being modeled is accounted for by representing the AT, RAT, and slack in terms of a probability density function. This obviates the need for multi-corner analysis and aggressive guard-band while targeting a specific percentage yield for timing optimization and analysis.

Two possible ways to arrive at the slack distribution with SSTA is by using "path-based" and "block-based" SSTA. The level of accuracy required for the integrated circuit under development may determine the method of SSTA that is used. For both path-based and block-based analysis techniques, the slack is represented in a probability density function of the slack yield for all the paths considered in the analysis as a virtual sink. This allows the designer to understand the probability of timing failure for the entire design in one graph. Traditionally, this final slack distribution may allow the designer to make critical decisions about yield and performance tradeoffs with respect to the integrated circuit.

During timing closure in traditional methods, a statistical static timing analyzer will be used to target a slack yield for a particular design. The slack yield could then be set to 3-sigma, for instance, to cover 99.97% of the area under the probability density function curve. The objective of optimization would then be to target the acceptable yield while reducing the nominal delay and variance for each path to produce a more optimal solution. For example, in order to meet a specific frequency target for an integrated circuit under development the slack yield may be used to close the timing of the integrated circuit.

In embodiments of the disclosed invention, instead of taking the traditional route of using the slack yield to close timing, the timing is closed using a maximum clock period (e.g., clock cycle) or minimum clock frequency at which the integrated circuit can function without failure. For example, an integrated circuit clock cycle and operation frequency are computed as a function of process and environmental variations. In accordance with aspects of the invention, a probability distribution of the clock cycle is computed for efficient computation of the probability distribution of the chip frequency. Specifically, an integrated circuit clock cycle is calculated in linear canonical form based upon slack canonical input and the calculation takes into consideration multi-cycle, half-cycle, and cross-domain conditions of the integrated circuit.

Advantageously, in embodiments, the systems and methods for computing an integrated circuit clock cycle in linear conical form allows for timing closure for speed binning without multiple timing runs. Also, advantageously, in embodiments, the systems and methods for computing a circuit clock cycle in linear conical form allows for drive circuit optimization for speed binning by maximizing profit depending on chip distribution among frequency bins and achieving desirable distribution of chips among bins.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof.

Program code embodied on a computer readable medium may be transmitted using any appropriate medium, including but not limited to wireless, wireline, optical fiber cable, RF, etc., or any suitable combination of the foregoing.

Computer program instructions may also be stored in the computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories, which provide temporary storage of at least some program code, in order to reduce the number of times code should be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard, etc.

In general, the processor 20 executes computer program code (e.g., program control 44), which can be stored in the memory 22A and/or storage system 22B. Moreover, in accordance with aspects of the invention, the program control 44 controls an computation tool 100 to perform the processes described herein. The computation tool 100 can be implemented as one or more program code in the program control 44 stored in memory 22A as separate or combined modules. Additionally, the computation tool 100 may be implemented as a separate dedicated processor or several processors to provide the function of this tool. While executing the computer program code, the processor 20 can read and/or write data to/from memory 22A, storage system 22B, and/or I/O interface 24. The program code executes the processes of the invention. The bus 26 provides a communications link between each of the components in the computing device 14.

In embodiments, the computation tool 100 can compute a circuit clock cycle in linear conical form based upon slack canonical input with consideration for multi-cycle, half-cycle, and cross-domain conditions. For example, in accordance with aspects of the invention, the computation tool 100 can load circuit design and timing models for at least one circuit path, perform an SSTA for the chip design, compute a clock cycle in conical form based upon slack canonical input from the SSTA, compute objective functions, and update a netlist to reduce variation and increase clock frequency in the chip design.

Flow Diagram

Figure 2:
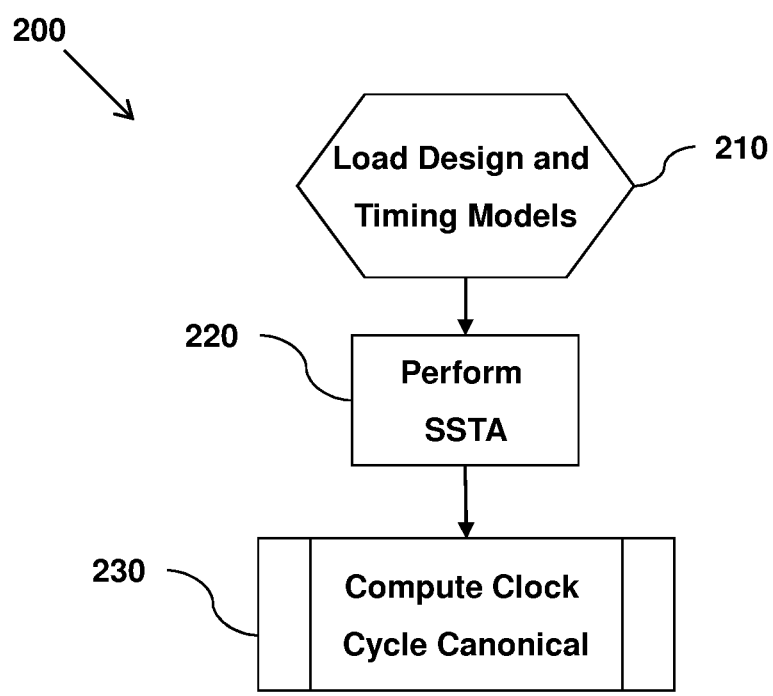
FIG. 2 is an illustrative process flow of implementing the system in accordance with aspects of the invention.
Figure 7:
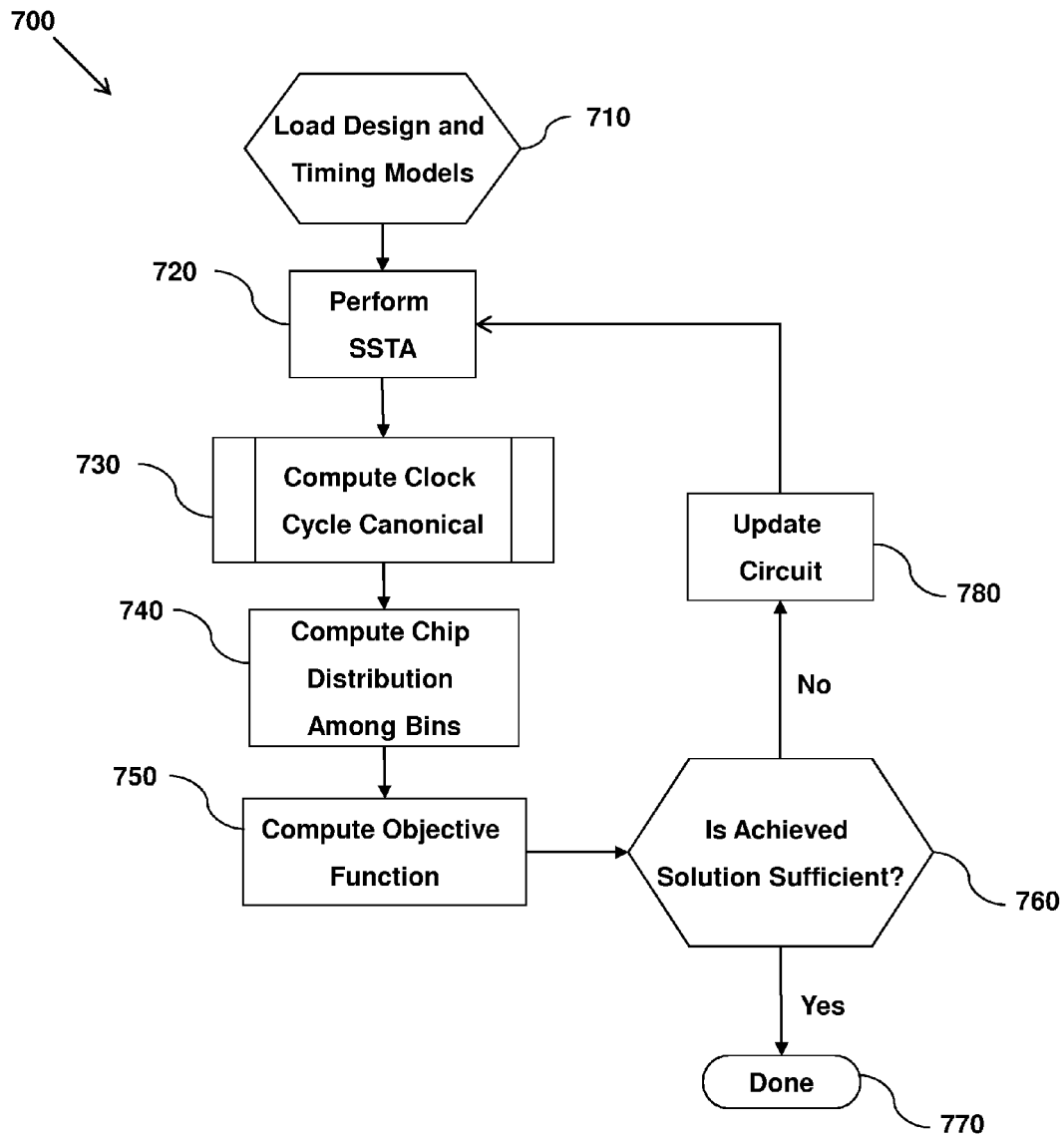
FIG. 7 is an illustrative process flow of implementing the system in accordance with aspects of the invention.

FIGS. 2 and 7 show exemplary flows for performing aspects of the present invention. The steps of FIGS. 2 and 7 may be implemented in the environment of FIG. 1, for example.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

In embodiments, as shown in FIG. 2, a circuit clock cycle for an integrated circuit or specified region of the integrated circuit is calculated in linear conical form based upon slack canonical input from an SSTA of the integrated circuit or specified region of the integrated circuit. The computation of the circuit clock cycle may take into consideration multi-cycle, half-cycle, and cross-domain conditions of the integrated circuit. In accordance with aspects of the invention, the circuit clock cycle is looked at in conical form as a function of the slack canonical input with the presence of integrated circuit variation in order to determine a maximum clock period that the integrated circuit can perform at without failure.

At step 210, design and timing models for the integrated circuit or specified testing region of the integrated circuit may be loaded into a computing device. For example, a design structure and timing models for at least one circuit path of an integrated circuit or a specified region of the integrated circuit may be loaded into the computation tool 100 (as discussed with respect to FIG. 1). The design and timing models for the integrated circuit may be found or provided by a designer of the integrated circuit.

At step 220, an SSTA may be computed for a netlist of the at least one circuit path of the integrated circuit or the specified region of the integrated circuit. In accordance with aspects of the invention, the SSTA may be computed using methods comprising a sensitivity-based approach to model the effect of possible variation in the integrated circuit or the specified region of the integrated circuit on the timing of the at least one circuit path. As discussed above, this may include establishing how changes in a particular device or interconnect parameter, such as oxide or wire thickness, affects a desired property of the integrated circuit, such as slew or capacitance of the integrated circuit. It is possible to subsequently use the parameter variation information for a timing analysis by generating models, which define sensitivities to these parameters. For the integrated circuit or the specified region of the integrated circuit, these sensitivities represent how the change in a particular parameter affects delay, slew, setup, hold, etc., and may be generated during library characterization. For interconnects, these sensitivities represent how a change in each parameter affects resistance, capacitance, and inductance, and may be generated during extraction.

These sensitivities can then be used in conjunction with a PDF to provide a full distribution for each parameter. The parameter distributions could be either Gaussian or non-Gaussian distributions since the sensitivity is delay per parameter change and is not dependant on the probability function. The sensitivities can be either linear or nonlinear depending on the device parameter.

Once the sensitivities to these parameters are defined, an SSTA engine, e.g., computation tool 100, can then compute all ATs, RATs, and slacks for nodes of the integrated circuit or the specified region of the integrated circuit. The slack associated with each node is the difference between the RAT and the AT for each node. A positive slack implies that the arrival time at that node may be increased by a certain amount without affecting the overall delay of the circuit. Conversely, a negative slack implies that a path is too slow, and the path should be sped up (or the reference signal delayed) if the whole circuit is to work at the desired speed.

Figure 3:
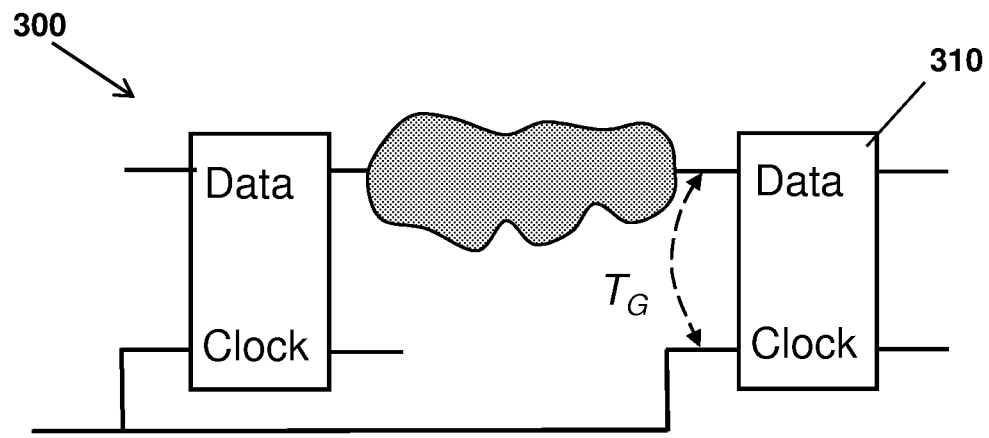
FIG. 3 is an illustration that shows an exemplary single cycle path.
Figure 3:
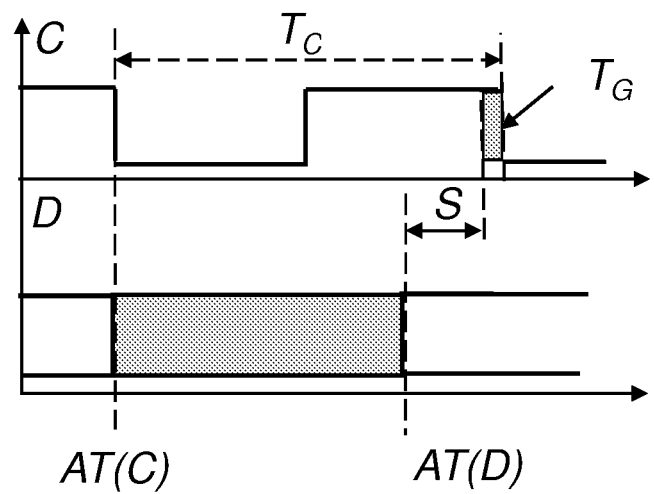

At step 230, a circuit clock cycle for the integrated circuit or the specified region of the integrated circuit may be computed in linear canonical form based upon the slack canonical input obtained from the SSTA. In embodiments, a clock cycle for at least one circuit path of the integrated circuit or the specified region of the integrated circuit may be computed in linear canonical form. The computed clock cycle for the at least one circuit path may then be used to calculate the circuit clock cycle or operating frequency for the integrated circuit or the specified region of the integrated circuit. For example, as shown in FIG. 3, a clock cycle for a single cycle path 300 of the integrated circuit or a specified region of the integrated circuit may be computed by initially setting up a slack equation (1).

$$S = AT(C) + T_C - AT(D) - T_G \qquad (1)$$

S is the slack calculated for the given node 310 of the single cycle path 100, AT(C) is the arrival time of the clock signal, $T_C$ is the clock cycle, the AT(D) is the arrival time of the data signal, and $T_G$ is a guard time or a test constraint.

In embodiments, the $T_C$ clock cycle is the time between two adjacent pulses and sets a tempo of the integrated circuit. The number of these pulses per second is the clock speed or frequency of the integrated circuit. The clock speed for the integrated circuit may be determined by an oscillator, such as a quartz-crystal circuit, as understood by those of ordinary skill in the art. The test constraint, e.g., a set up margin, is a separation between the clock and the data arrival times at an endpoint that is required for the node 310 to operate correctly. The test constraint may be specified by the designer of the integrated circuit and/or characterized in the library for the integrated circuit.

In accordance with aspects of the invention, the AT(C), AT(D) and $T_G$ (e.g., the slack canonical input data) are obtained from the STTA performed in step 220. The $T_C$ (clock cycle) is conventionally fixed at a predetermined value in order to obtain a positive S (slack). However, in embodiments of the invention, the $T_C$ is not fixed and instead is calculated using equation (2) to solve for $T_C$.

$$T_C = AT(D) - AT(C) + T_G + S. \qquad (2)$$

As can be seen in equation (2), the clock cycle of the integrated circuit is dependent on the slack of the integrated circuit such that the greater the S the greater the $T_C$ or the faster running the integrated circuit will be.

In embodiments, the slack from equation (2) may be set equal to zero such that equation (3) is obtained.

$$T_C = AT(D) - AT(C) + T_G. \qquad (3)$$

AT(D), AT(C), and $T_G$ are expressed in canonical form since these values were obtained from the SSTA performed in step 220, and therefore the resultant $T_C$ is also expressed in canonical form. Advantageously, by computing the clock cycle $T_C$ in canonical form from the SSTA, the clock cycle or operational frequency of the integrated circuit is calculated as a function of the effect of environmental and process variation in the integrated circuit on the timing of the integrated circuit. For example, this relationship can be seen in equation (4).

$$T_C = t_0 + \sum_{i=1}^{n} a_i \Delta X_i + r \Delta R \qquad (4)$$

Where $t_0$ is the timing in mean canonical form, $$\sum_{i=1}^{n} a_i \Delta X$$

is sources of variation, such as environment, systematic, and/or chip-chip process variation, and $r \Delta R$ is random variation. A timing test for the single cycle path 300 may be satisfied for the clock cycle when $T > T_C$; where T is a predetermined maximum clock period, e.g., 700 mHz, and $T_C$ is the calculated clock cycle in linear canonical form based upon the canonical input.

Figure 4:
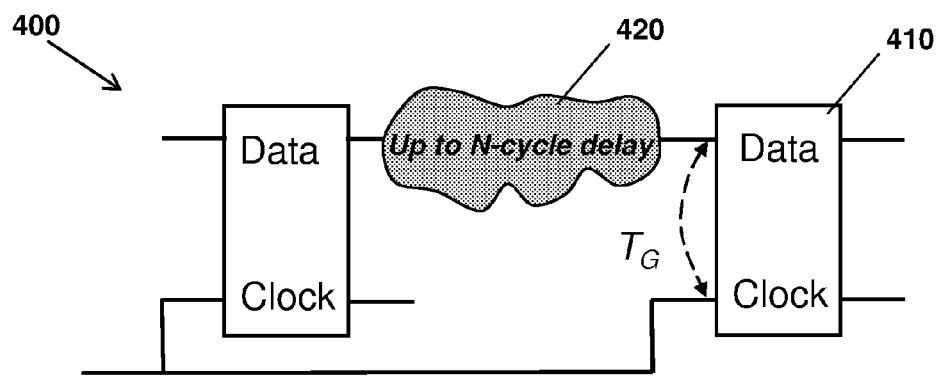
FIG. 4 is an illustration that shows an exemplary multi-cycle path.
Figure 4:
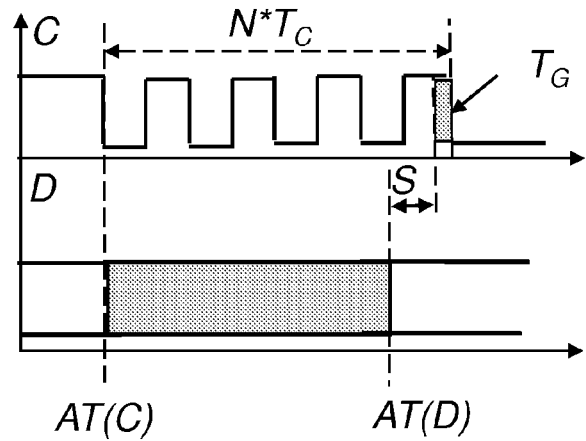

In embodiments, the computed circuit clock cycle may also take into consideration multi-cycle paths, half-cycle paths, and multi-clock domains. As shown in FIG. 4, a clock cycle for a multi-cycle path 400 of the integrated circuit or a specified region of the integrated circuit may be computed by initially setting up a slack equation (5):

$$S = AT(C) + N*T_C - AT(D) - T_G. \quad (5)$$

S is the slack calculated for the given node 410 of the multi-cycle path 200, AT(C) is the arrival time of the clock signal, N is representative of a logic cone of data 420 causing a cycle delay, $T_C$ is the clock cycle, AT(D) is the arrival time of the data signal, and $T_G$ is the test constraint. In embodiments, N multiplies out the clock cycles to represent the delay caused from the logic cone of data 420.

In embodiments of the invention, the clock cycle is calculated using equation (6) to solve for $T_C$.

$$T_C = (AT(D) - AT(C) + T_G + S)/N. \quad (6)$$

The slack may be set equal to zero to obtain equation (7):

$$T_C = (AT(D) - AT(C) + T_G)/N. \quad (7)$$

As discussed above, the timing clock cycle $T_C$ is expressed in canonical form because it is calculated based on the canonical input obtained from the SSTA in step 220. A timing test for the multi-cycle path 400 may be satisfied for the clock cycle when $T > T_C$; where T is a predetermined maximum clock period, e.g., 700 mHz, and $T_C$ is the calculated clock cycle in linear canonical form based upon the canonical input.

Figure 5:
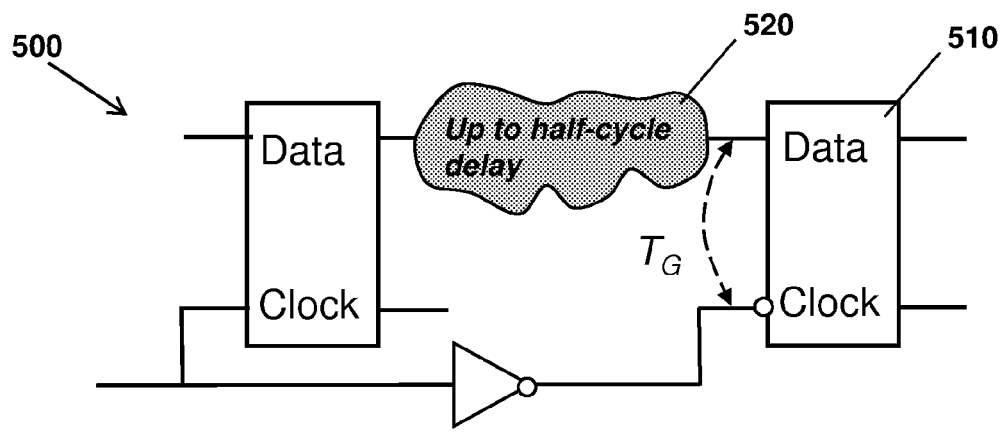
FIG. 5 is an illustration that shows an exemplary half-cycle path.
Figure 5:
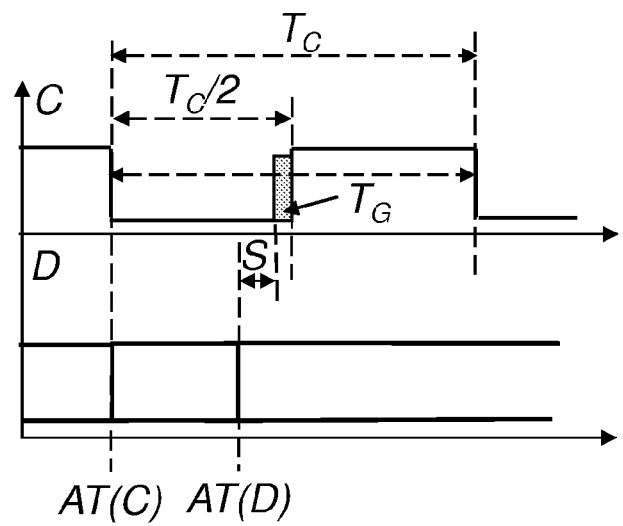

In FIG. 5, a clock cycle for a half-cycle path 500 of the integrated circuit or a specified region of the integrated circuit may be computed by initially setting up a slack equation (8):

$$S = AT(C) + T_C/2 - AT(D) - T_G. \quad (8)$$

S is the slack calculated for the given node 510 of the half-cycle path 500, AT(C) is the arrival time of the clock signal, $T_C$ is the clock cycle, AT(D) is the arrival time of the data signal, and $T_G$ is the test constraint. In embodiments, the $T_C/2$ is representative of up to a half-cycle delay caused by a logic cone of data 520 causing a cycle delay.

In embodiments of the invention, the clock cycle is calculated using equation (9) to solve for $T_C$.

$$T_C = 2*(AT(D) - AT(C) + T_G + S). \quad (9)$$

The slack may be set equal to zero to obtain equation (10):

$$T_C = 2*(AT(D) - AT(C) + T_G). \quad (10)$$

As discussed above, the timing clock cycle $T_C$ is expressed in canonical form because it is calculated based on the canonical input obtained from the SSTA in step 220. A timing test for the multi-cycle path 500 may be satisfied for the clock cycle when $T > T_C$; where T is a predetermined maximum clock period, e.g., 700 mHz, and $T_C$ is the calculated clock cycle in linear canonical form based upon the canonical input.

Figure 6:
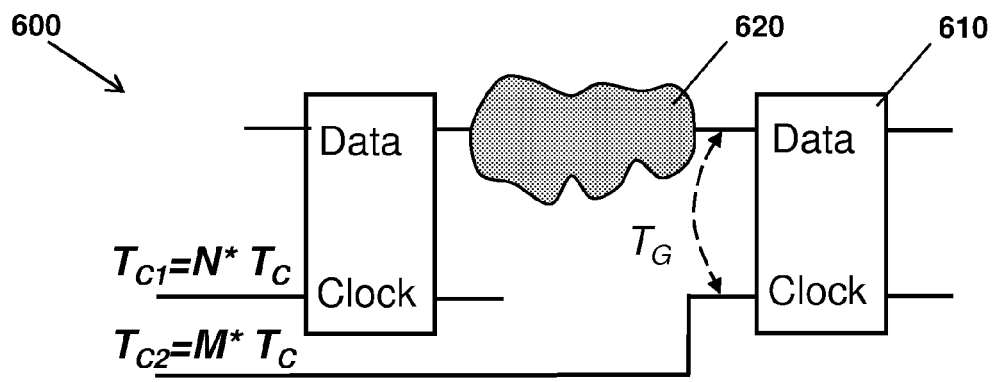
FIG. 6 is an illustration that shows an exemplary multi-clock path.
Figure 6:
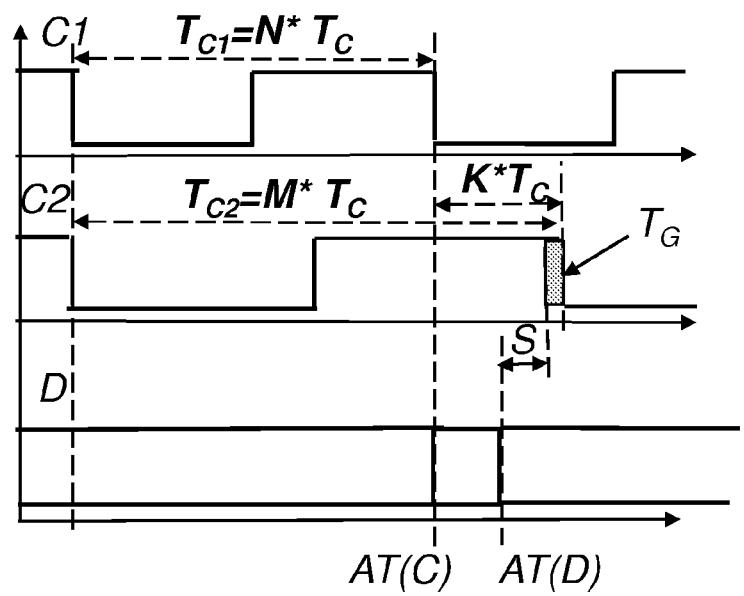

In FIG. 6, a clock cycle for multi-clock domains 600 of the integrated circuit or a specified region of the integrated circuit may be computed by initially setting up a slack equation (11):

$$S = AT(C) + K*T_C - AT(D) - T_G. \quad (11)$$

S is the slack calculated for the given node 410 of the multi-clock domain 400, AT(C) is the arrival time of the clock signal, $T_C$ is the clock cycle, AT(D) is the arrival time of the data signal, and $T_G$ is the test constraint. In embodiments, K is the greatest common divider of N and M. N multiplies out the first clock cycle $T_{C1}$ to represent the delay from the logic cone of data 420, and M multiplies out the second clock cycle $T_{C2}$ to represent the delay from the logic cone of data 420.

In embodiments of the invention, the clock cycle is calculated using equation (12) to solve for $T_C$.

$$T_C = (AT(D) - AT(C) + T_G + S)/K. \quad (12)$$

The slack may be set equal to zero to obtain equation (13):

$$T_C = (AT(D) - AT(C) + T_G)/K. \quad (13)$$

As discussed above, the timing clock cycle $T_C$ is expressed in canonical form because it is calculated based on the canonical input obtained from the SSTA in step 220. A timing test for the multi-cycle path 600 may be satisfied for the clock cycle when $T > T_C$; where T is a predetermined maximum clock period, e.g., 700 mHz, and $T_C$ is the calculated clock cycle in linear canonical form based upon the canonical input.

In embodiments, once clock cycles are computed in linear canonical form for each circuit path of the integrated circuit or the specified region of the integrated circuit, a statistical circuit clock cycle for an entirety of the integrated circuit or the specified region of the integrated circuit may be calculated. For example, a statistical maximum clock cycle for the i-th setup-timing test may be obtained using equation (14).

$$T_{C,i} = t_0 + \sum_{i=1}^{n} a_i \Delta X_i + r\Delta R. \quad (14)$$

Where $t_0$ is the timing in mean canonical form, $$\sum_{i=1}^{n} a_i \Delta X$$

is sources of variation, such as environment, systematic, and/or chip-chip process variation, and $r\Delta R$ is random variation.

The maximum circuit clock cycle T for the entirety of the integrated circuit or the specified region of the integrated circuit may be calculated as a statistical maximum using equation (15).

$$T_C = MAX(T_{C,i}). \quad (15)$$

The statistical maximum computation on all linear canonical clock cycles provides a minimum operating frequency, at which the integrated circuit or the specified region of the integrated circuit may be run. Advantageously, instead of taking the conventional route of using the slack to close timing for the integrated circuit or the specified region of the integrated circuit, the timing may be closed using the calculated maximum circuit clock cycle or the minimum operational frequency at which the integrated circuit or the specified region of the integrated circuit can function without failure.

In additional embodiments, the statistical maximum for the linear canonical circuit clock cycle may be projected to obtain a deterministic value. For example, a deterministic maximum may be obtained for the statistical projection by using equation (16).

$$T_C = MAX(Proj(T_{C,i})). \quad (16)$$

Advantageously, calculating the circuit clock cycle in linear canonical form based on consideration for multi-cycle, half-cycle, and cross-domain conditions of the integrated circuit allows for computing a probability distribution of the circuit clock cycle. From the probability distribution of the circuit clock cycle, the probability distribution of the integrated circuit frequency can be computed. In embodiments, the probability distribution may then be used for distribution of multiple integrated circuits amongst frequency bins.

FIG. 7 provides one example of an application where the computed circuit clock cycle can be used for speed binning, e.g., the distribution of multiple integrated circuits amongst frequency bins. Advantageously, this allows for timing closure of the speed binning without multiple runs. However, one of ordinary skill in the art would appreciate that the above-mentioned processes for calculating the circuit clock cycle in linear canonical form could have many applications, and the disclosed invention is not limited to the exemplary use of the computed circuit clock cycle in speed binning.

In embodiments, steps 700-720 are performed as disclosed in detail above with respect to steps 210-230. At step 740, the mean and sigma of the circuit clock cycles for each integrated circuit chip, are calculated. The calculated mean and sigma of the circuit clock cycles are then used in calculating the fraction of integrated circuit chips for each speed bin. The integrated circuit chips may then be distributed amongst the speed bins.

At step 750, the circuit is optimized to improve or achieve desirable distribution of the integrated circuit chips amongst the speed bins. For example, possible objective functions that may be used to optimize the integrated circuit chips may include equations (17) and (18).

$$Q = \sum_{k=1}^{m} \alpha_k N_k. \tag{17}$$

$$Q = \sum_{k=1}^{m} (N_k - N_{k,targ})^2. \tag{18}$$

Equation (17) provides "Q" the sum of weighted bin sizes and equation (18) provides "Q" the sum of squared bin size deviations from target values. Also, $\alpha_k$ is a relative value of bin number k, and $N_k$ and $N_{k,targ}$ are target values of bin sizes.

At step 760, a determination is made as to whether the integrated circuit chips have been optimization and improvement in the speed binning has been achieved. If optimization and improvement have been achieved sufficiently, then the process ends at step 770. If optimization and improvement have not been achieved sufficiently, then the integrated circuit chips are updated in step 780 and the process starts over again at step 720 by computing the SSTA for the updated integrated circuit chips. Advantageously, the above-disclosed systems and methods for computing the circuit clock cycle in linear conical form for each of the integrated circuit chips allows for the integrated circuit chip optimization for speed binning by maximizing profit depending on the integrated circuit chip distribution amongst the speed bins and achieving desirable distribution of the integrated circuit chips amongst the speed bins.

Figure 8:
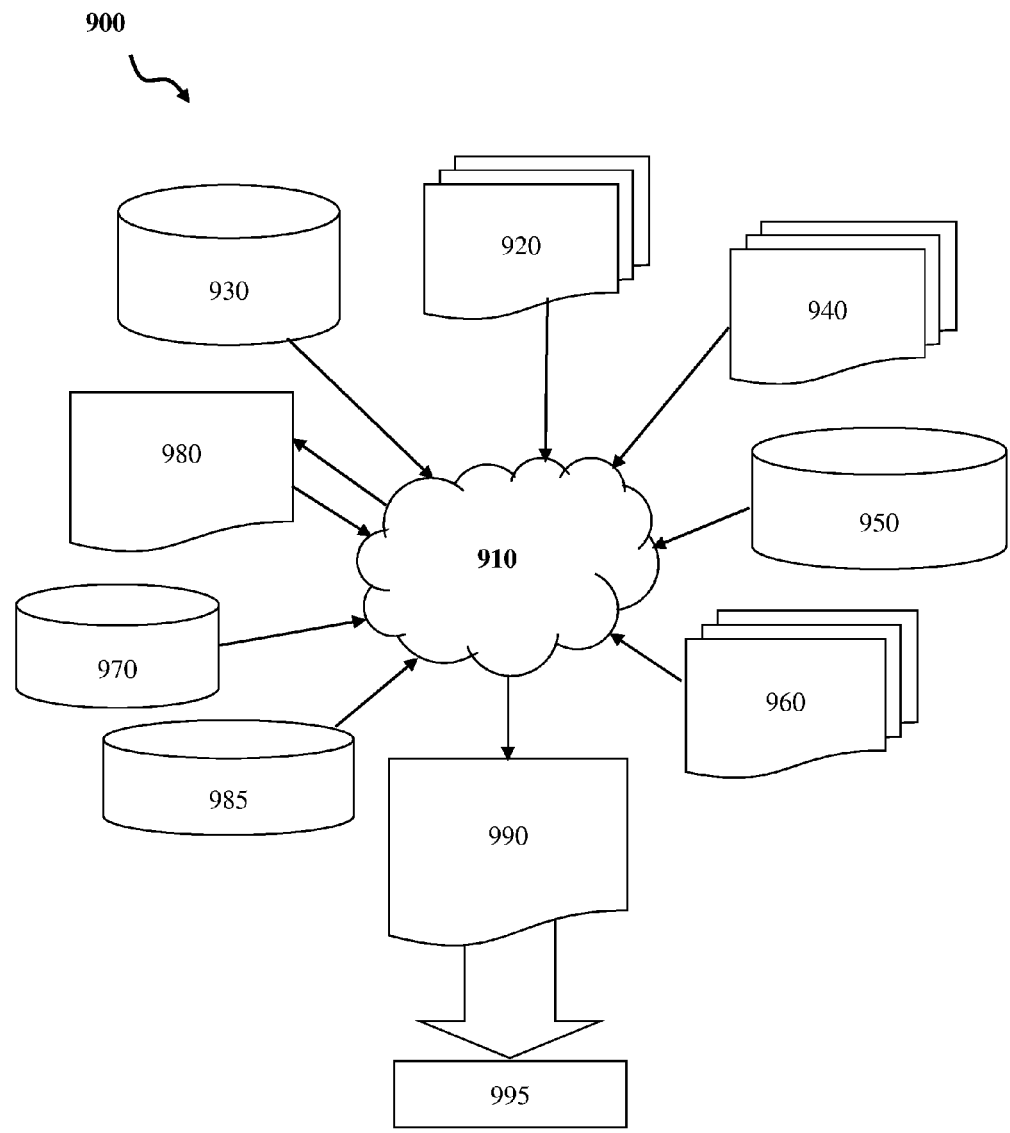
FIG. 8 is a flow diagram of a design process used in semiconductor design, manufacture, and/or test.

FIG. 8 is a flow diagram of a design process used in semiconductor design, manufacture, and/or test used with the system and method of the present invention. FIG. 8 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 8 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system, which can be implemented with the method and system of the present invention. As such, design structure 920 may comprise files or other data structures including human and/or machine-readable source code, compiled structures, and computer-executable code structures that when processed by a design or simulation data processing system functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 that may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990.

Design structure 990 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more devices. In one embodiment, design structure 990 may comprise a compiled, executable HDL simulation model that functionally simulates the devices.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure. Design structure 990 may then proceed to a stage 995 where, for example, design structure 990: proceeds to tape-out, is released to manufacturing, is released to a mask house, is sent to another design house, is sent back to the customer, etc.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    loading a design and timing model for at least one circuit path of an integrated circuit or a region of the integrated circuit into a computing device;
    using the computing device to perform a statistical static timing analysis (SSTA) of the at least one circuit path using the loaded design and timing model to obtain slack canonical data; and
    calculating a maximum circuit clock cycle for the integrated circuit or the specified region of the integrated circuit in linear canonical form based upon the slack canonical data obtained from the SSTA,
    wherein the maximum circuit clock cycle for the integrated circuit or the specified region of the integrated circuit is calculated as a statistical maximum on all linear canonical clock cycles computed for the integrated circuit or the specified region of the integrated circuit.

2. The method of claim 1, further comprising calculating a clock cycle for the at least one circuit path by setting up a slack equation and solving the slack equation for the clock cycle.

3. The method of claim 2, wherein the calculating the clock cycle comprises setting slack in the slack equation equal to zero.

4. The method of claim 2, wherein the slack equation comprises:
    a clock arrival time of a clock signal at a node on the at least one circuit path;
    a data arrival time of a data signal at the node on the at least one circuit path; and
    a test constraint for the clock arrival time and the data arrival time.

5. The method of claim 4, wherein the clock arrival time, the data arrival time, and the test constraint are the slack canonical input obtain from the SSTA, and are expressed in canonical form, which results in the clock cycle for the at least one circuit path being calculated in canonical form.

6. The method of claim 5, further comprising performing a timing test for the at least one circuit path, which is satisfied when a predetermined maximum clock period is greater than the clock cycle.

7. The method claim 6, wherein the clock cycle is calculated as a function of an effect of environmental and process variation in the integrated circuit or the region of the integrated circuit on timing of the integrated circuit the region of the integrated circuit.

8. The method of claim 2, wherein the at least one circuit path is a single cycle path.

9. A method comprising
loading a design and timing model for at least one circuit path of an integrated circuit or a region of the integrated circuit into a computing device;
using the computing device to perform a statistical static timing analysis (SSTA) of the at least one circuit path using the loaded design and timing model to obtain slack canonical data;
calculating a maximum circuit clock cycle for the integrated circuit or the specified region of the integrated circuit in linear canonical form based upon the slack canonical data obtained from the SSTA; and
calculating a clock cycle for the at least one circuit path by setting up a slack equation and solving the slack equation for the clock cycle,
wherein the at least one circuit path is a multi-cycle path, and the slack equation comprises:
a clock arrival time of a clock signal at a node on the multi-cycle path, a data arrival time of a data signal at the node on the multi-cycle path;
a test constraint for the clock arrival time and the data arrival time; and
a multiplier for the clock cycle that represents delay caused from a logic cone on the multi-cycle path.

10. A method comprising:
loading a design and timing model for at least one circuit path of an integrated circuit or a region of the integrated circuit into a computing device;
using the computing device to perform a statistical static timing analysis (SSTA) of the at least one circuit path using the loaded design and timing model to obtain slack canonical data;
calculating a maximum circuit clock cycle for the integrated circuit or the specified region of the integrated circuit in linear canonical form based upon the slack canonical data obtained from the SSTA; and
calculating a clock cycle for the at least one circuit path by setting up a slack equation and solving the slack equation for the clock cycle,
wherein the at least one circuit path is a half-cycle path, and the slack equation comprises:
a clock arrival time of a clock signal at a node on the half-cycle path;
a data arrival time of a data signal at the node on the half-cycle path;
a test constraint for the clock arrival time and the data arrival time; and
a factor for the clock cycle that represents up to a half-cycle delay caused from a logic cone on the half-cycle path.

11. A method comprising:
loading a design and timing model for at least one circuit path of an integrated circuit or a region of the integrated circuit into a computing device;
using the computing device to perform a statistical static timing analysis (SSTA) of the at least one circuit path using the loaded design and timing model to obtain slack canonical data;
calculating a maximum circuit clock cycle for the integrated circuit or the specified region of the integrated circuit in linear canonical form based upon the slack canonical data obtained from the SSTA; and
calculating a clock cycle for the at least one circuit path by setting up a slack equation and solving the slack equation for the clock cycle,
wherein the at least one circuit path comprises multi-clock domains, and the slack equation comprises:
a clock arrival time of a clock signal at a node on the at least one circuit path;
a data arrival time of a data signal at the node on the at least one circuit path;
a test constraint for the clock arrival time and the data arrival time; and
a greatest common divider of multipliers for each clock domain of the multi-clock domains on the at least one circuit path.

12. A method comprising:
loading a design and timing model for at least one circuit path of an integrated circuit or region of an integrated circuit into a computing device;
using the computing device to perform a statistical static timing analysis (SSTA) of the at least one circuit path using the loaded design and timing model;
calculating a maximum circuit clock cycle for the integrated circuit or the specified region of the integrated circuit in linear canonical form based upon slack canonical input obtained from the SSTA; and
closing timing of the integrated circuit or the region of the integrated circuit using the calculated maximum circuit clock cycle,
wherein the maximum circuit clock cycle for the integrated circuit or the specified region of the integrated circuit is calculated as a statistical maximum on all linear canonical clock cycles computed for the integrated circuit or the specified region of the integrated circuit.

13. The method of claim 12, further comprising calculating a clock cycle for the at least one circuit path by setting up a slack equation and solving the slack equation for the clock cycle, wherein slack in the slack equation is set equal to zero.

14. The method of claim 13, wherein the slack equation comprises:
a clock arrival time of a clock signal at a node on the at least one circuit path;
a data arrival time of a data signal at the node on the at least one circuit path; and
a test constraint for the clock arrival time and the data arrival time.

15. The method of claim 14, further comprising performing a timing test for the at least one circuit path, which is satisfied when a predetermined maximum clock period is greater than the clock cycle, wherein:
the clock arrival time, the data arrival time, and the test constraint are the slack canonical input obtain from the SSTA, and are expressed in canonical form, which results in the clock cycle for the at least one circuit path being calculated in canonical form; and
the clock cycle is calculated as a function of an effect of environmental and process variation in the integrated circuit or the region of the integrated circuit on timing of the integrated circuit the region of the integrated circuit.

16. A method comprising:
loading a design and timing model for at least one circuit path of an integrated circuit or region of an integrated circuit into a computing device;
using the computing device to perform a statistical static timing analysis (SSTA) of the at least one circuit path using the loaded design and timing model;
calculating a maximum circuit clock cycle for the integrated circuit or the specified region of the integrated circuit in linear canonical form based upon slack canonical input obtained from the SSTA;
closing timing of the integrated circuit or the region of the integrated circuit using the calculated maximum circuit clock cycle;
computing a probability distribution of the maximum circuit clock cycle for the integrated circuit or the region of the integrated circuit; and
distributing chips amongst frequency bins based on the probability distribution of the maximum circuit clock cycle.

17. A method comprising:
loading a design and timing model for at least one circuit path of an integrated circuit or region of an integrated circuit into a computing device;
using the computing device to perform a statistical static timing analysis (SSTA) of the at least one circuit path using the loaded design and timing model;
calculating a maximum circuit clock cycle for the integrated circuit or the specified region of the integrated circuit in linear canonical form based upon slack canonical input obtained from the SSTA;
closing timing of the integrated circuit or the region of the integrated circuit using the calculated maximum circuit clock cycle; and
computing optimization objection functions based on the calculated maximum circuit clock cycle in order to optimize the integrated circuit or the region of the integrated circuit.

18. A method comprising:
loading a design and timing model for at least one circuit path of an integrated circuit or region of an integrated circuit into a computing device;
using the computing device to perform a statistical static timing analysis (SSTA) of the at least one circuit path using the loaded design and timing model;
calculating a maximum circuit clock cycle for the integrated circuit or the specified region of the integrated circuit in linear canonical form based upon slack canonical input obtained from the SSTA;
closing timing of the integrated circuit or the region of the integrated circuit using the calculated maximum circuit clock cycle; and
guiding circuit optimization for frequency binning based on the calculated maximum circuit clock cycle.

19. A computer system for closing timing of an integrated circuit design to a maximum circuit clock cycle, the system comprising:
a CPU, a computer readable memory, and a computer readable storage media;
first program instructions for loading a design and timing model for at least one circuit path of an integrated circuit or region of an integrated circuit;
second program instructions for performing a statistical static timing analysis (SSTA) of the at least one circuit path using the loaded design and timing model;
third program instructions for calculating the maximum circuit clock cycle for the integrated circuit or the specified region of the integrated circuit in linear canonical form based upon slack canonical input obtained from the SSTA; and
fourth program instructions for closing timing of the integrated circuit or the region of the integrated circuit using the calculated maximum circuit clock cycle,
wherein the maximum circuit clock cycle for the integrated circuit or the specified region of the integrated circuit is calculated as a statistical maximum on all linear canonical clock cycles computed for the integrated circuit or the specified region of the integrated circuit and the first, second, third, and fourth program instructions are stored on the computer readable storage media for execution by the CPU via the computer readable memory.

20. The method of claim 1, further comprising calculating at least one linear canonical clock cycle for the at least one circuit path by setting up a slack equation and solving the slack equation for the clock cycle, wherein the slack equation comprises:
a slack calculated for a given node of the at least one circuit path;
a clock arrival time of a clock signal at the given node; and
a data arrival time of a data signal at the given node.

* * * * *